United States Patent
Cunningham et al.

(10) Patent No.: US 12,332,418 B2
(45) Date of Patent: Jun. 17, 2025

(54) PHOTONIC RESONATOR INTERFEROMETRIC SCATTERING MICROSCOPY

(71) Applicant: THE BOARD OF TRUSTEES OF THE UNIVERSITY OF ILLINOIS, Urbana, IL (US)

(72) Inventors: Brian T. Cunningham, Champaign, IL (US); Nantao Li, Champaign, IL (US); Taylor D. Canady, Champaign, IL (US); Qinglan Huang, Santa Clara, CA (US); Xing Wang, Champaign, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 142 days.

(21) Appl. No.: 18/263,749

(22) PCT Filed: Feb. 3, 2022

(86) PCT No.: PCT/US2022/015023
§ 371 (c)(1),
(2) Date: Aug. 1, 2023

(87) PCT Pub. No.: WO2022/169926
PCT Pub. Date: Aug. 11, 2022

(65) Prior Publication Data
US 2024/0094517 A1    Mar. 21, 2024

Related U.S. Application Data

(60) Provisional application No. 63/188,923, filed on May 14, 2021, provisional application No. 63/146,114, filed on Feb. 5, 2021.

(51) Int. Cl.
G02B 21/00 (2006.01)

(52) U.S. Cl.
CPC ....... *G02B 21/0056* (2013.01); *G02B 21/008* (2013.01)

(58) Field of Classification Search
CPC ................................. G02B 21/0056
(Continued)

(56) References Cited

U.S. PATENT DOCUMENTS

| 2006/0050394 A1 | 3/2006 | Suh et al. |
| 2009/0034051 A1 | 2/2009 | Arsenault |

(Continued)

OTHER PUBLICATIONS

The International Search Report (ISR) with Written Opinion for PCT/US2022/015023 dated May 12, 2022 pp. 1-9.
(Continued)

*Primary Examiner* — Amir Shahnami
(74) *Attorney, Agent, or Firm* — McDonnell Boehnen Hulbert & Berghoff LLP

(57) ABSTRACT

Disclosed herein are methods and systems that use a photonic crystal (PC) for interference scattering microscopy. Incident light is directed onto a surface of the PC and couples into a photonic crystal guided resonance (PCGR) mode of the PC such that less than 1% of the incident light is transmitted through the PC as transmitted light. One or more particles adjacent to the surface of the PC scatter a portion of the light coupled into the PCGR mode as scattered light. An image comprising a pattern of constructive and destructive interference between the transmitted light and the scattered light is formed, and an image sensor may capture one or more image frames of the image. Imaging processing of the one or more image frames can be used to identify at least one scattering center corresponding to at least one particle of the one or more particles.

52 Claims, 9 Drawing Sheets

(58) Field of Classification Search
USPC .......................................................... 348/78
See application file for complete search history.

(56) References Cited

U.S. PATENT DOCUMENTS

| | | |
|---|---|---|
| 2009/0114944 A1 | 5/2009 | Ono et al. |
| 2012/0305061 A1 | 12/2012 | O'Brien et al. |
| 2018/0216797 A1 | 8/2018 | Khorasaninejad et al. |
| 2019/0120766 A1 | 4/2019 | Cunningham et al. |
| 2019/0127784 A1 | 5/2019 | Cunningham et al. |

OTHER PUBLICATIONS

Taylor, R. W. et al., "Interferometric scattering microscopy: seeing single nanoparticles and molecules via Rayleigh scattering," Nano Letters, vol. 19, pp. 4827-4835 (2019).

Yang, Y. et al., "Interferometric plasmonic imaging and detection of single exosomes," Proceedings of the National Academy of Sciences, vol. 115, pp. 10275-10280 (2018).

Jaqaman, K. et al., "Robust single-particle tracking in live-cell time-lapse sequences," Nature Methods, vol. 5, pp. 695-702 (2008).

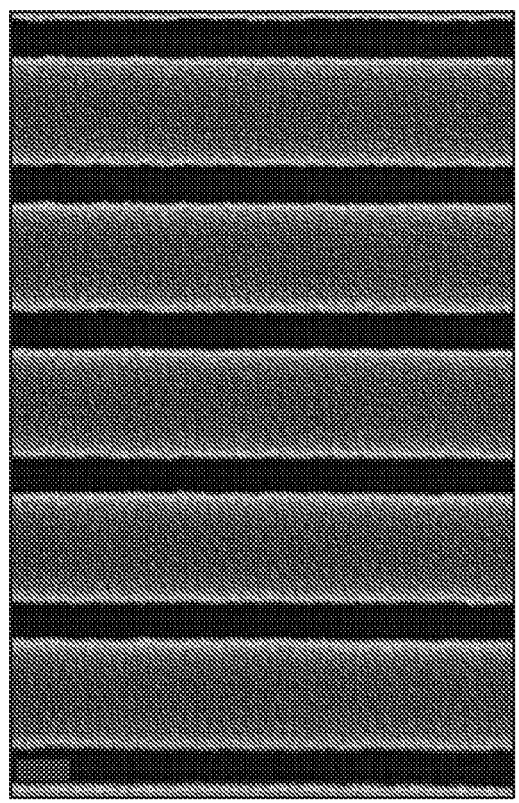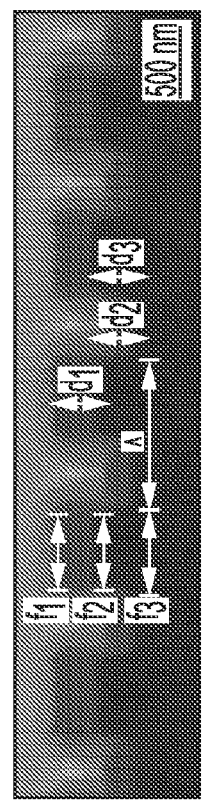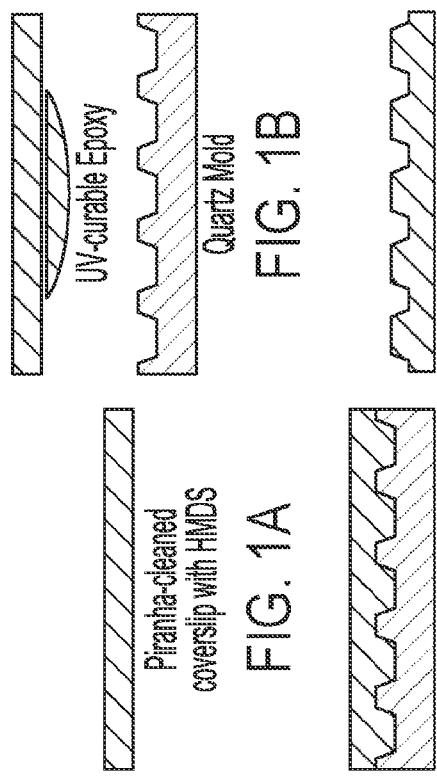
FIG. 1A FIG. 1B FIG. 1C FIG. 1D FIG. 1E FIG. 1F FIG. 1G

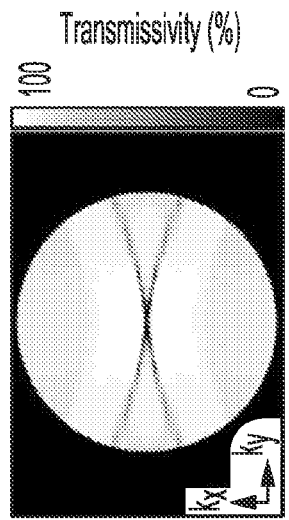
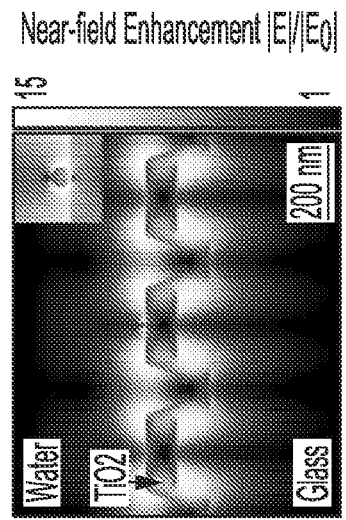
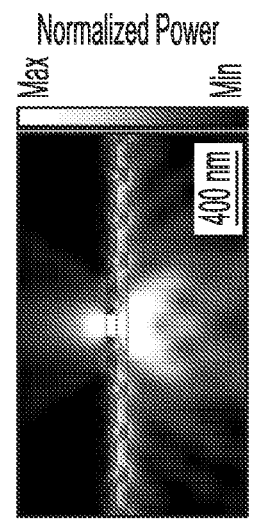
FIG. 2B
FIG. 2C
FIG. 2D
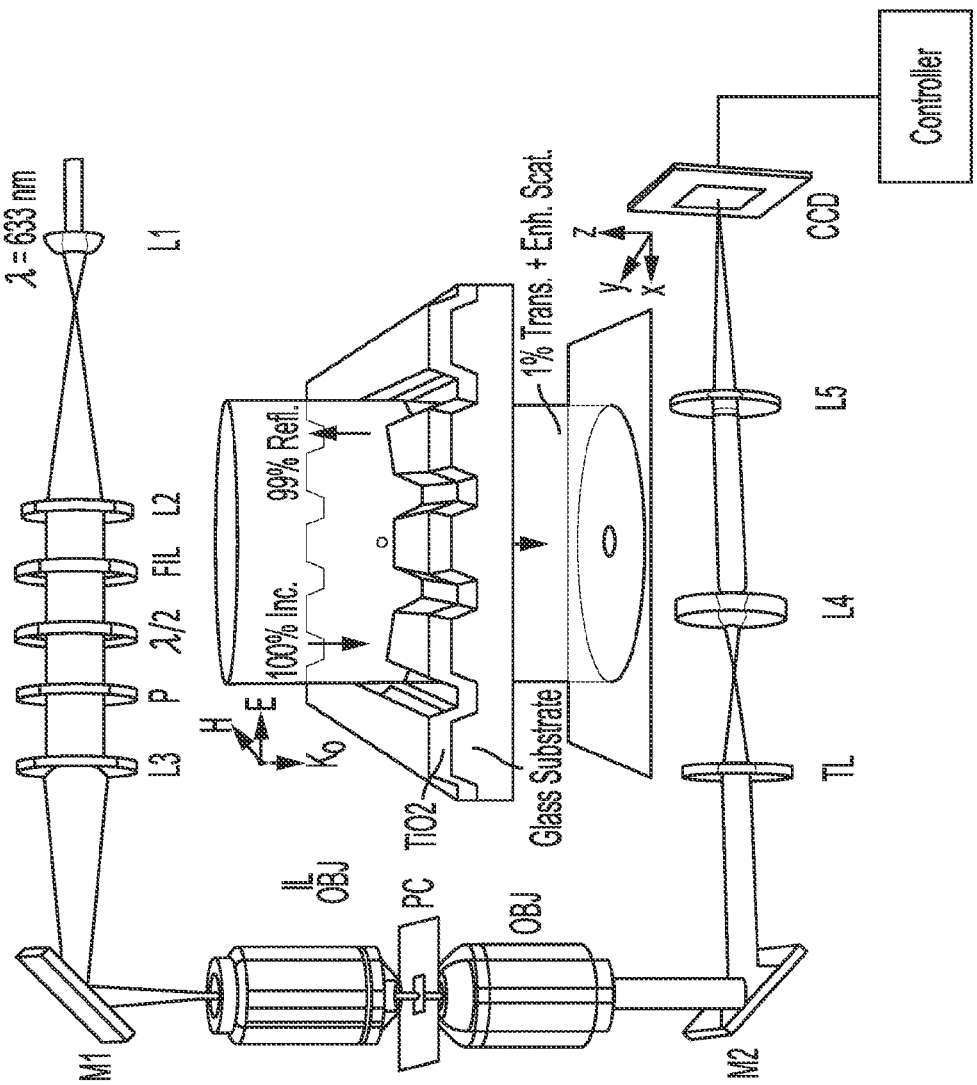
FIG. 2A

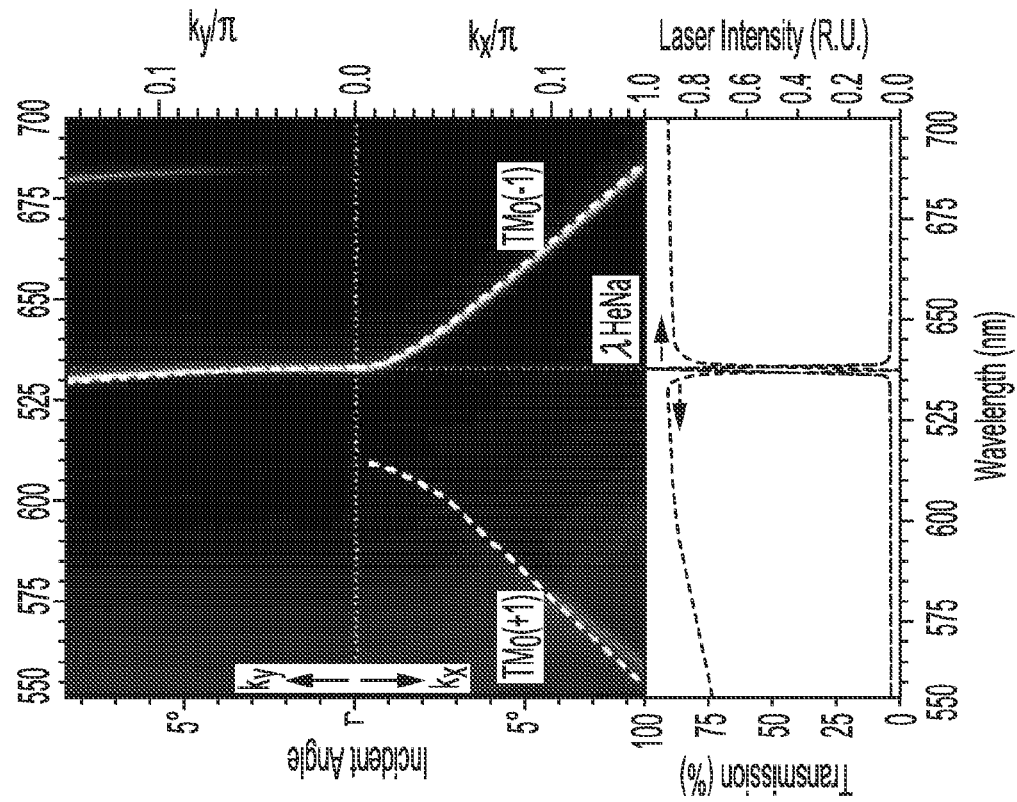
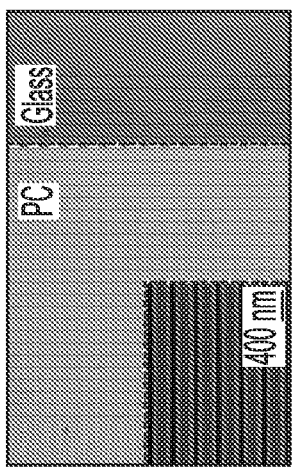
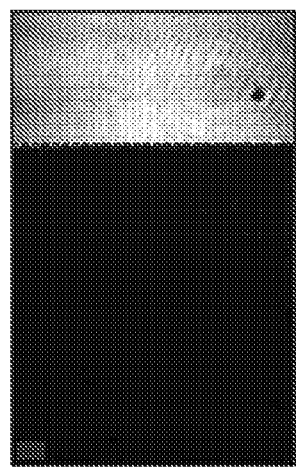
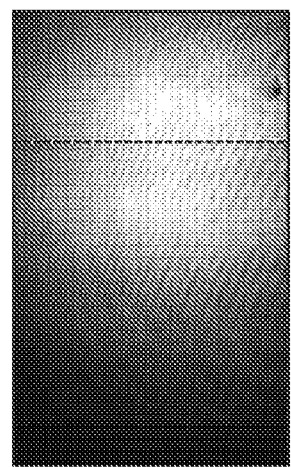
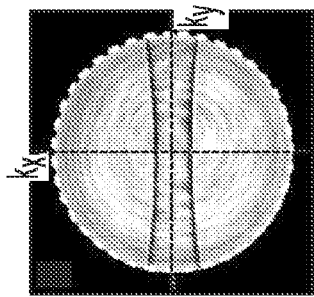
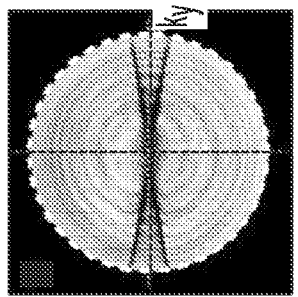
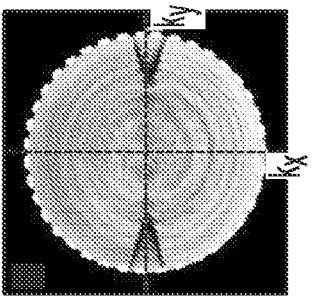
FIG. 3A
FIG. 3B
FIG. 3C
FIG. 3D
FIG. 3E
FIG. 3F
FIG. 3G

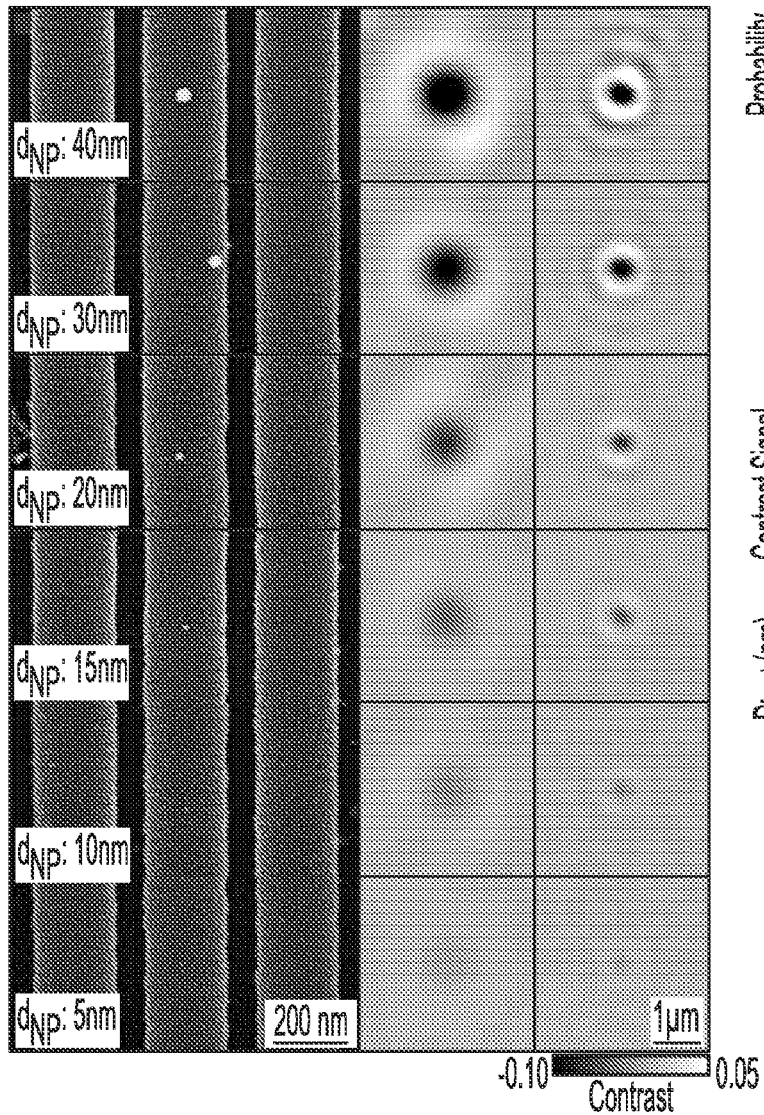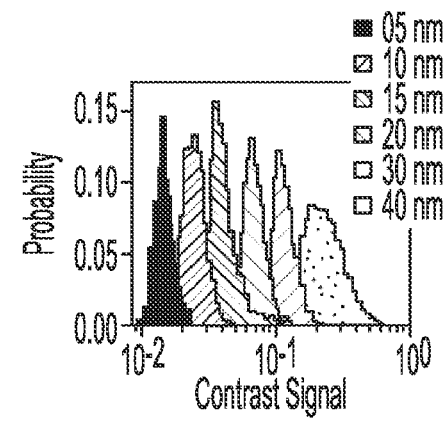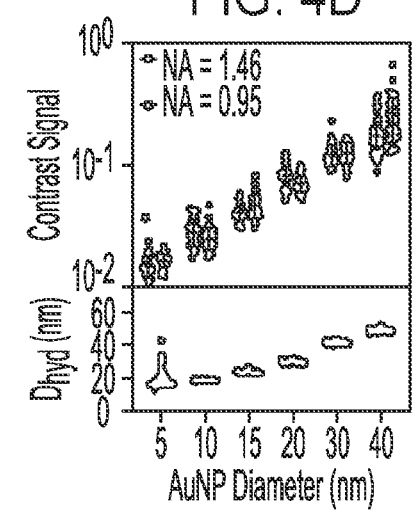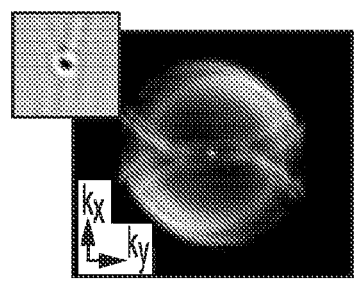
FIG. 4A  FIG. 4B  FIG. 4C  FIG. 4D  FIG. 4E  FIG. 4F

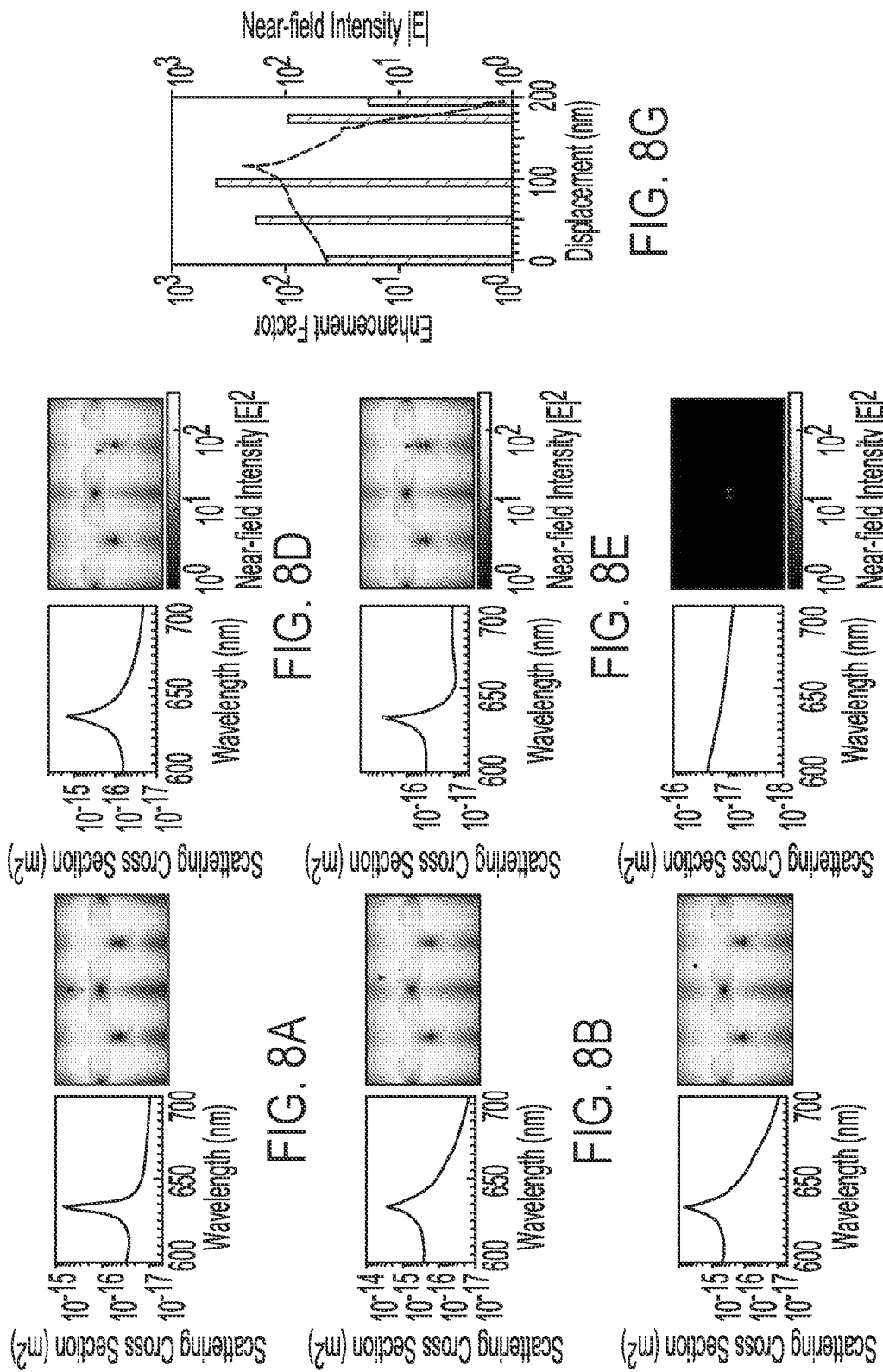

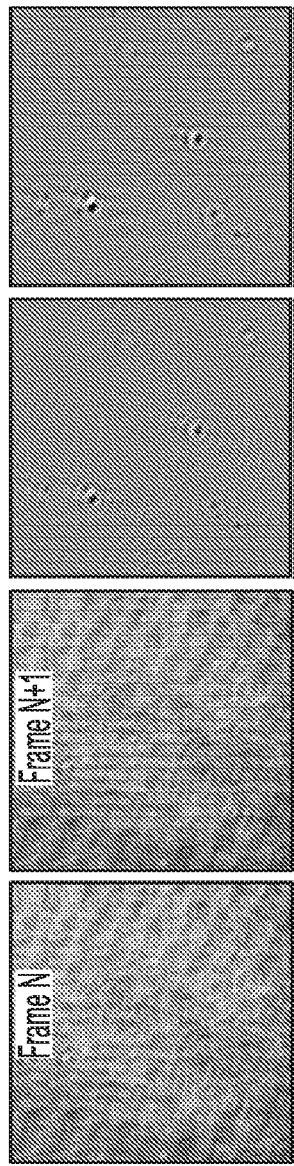
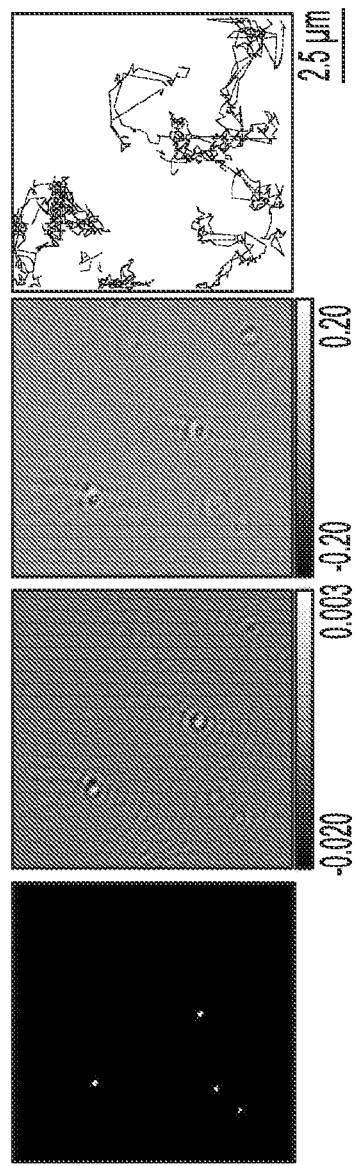
FIG. 9A FIG. 9B FIG. 9C FIG. 9D
FIG. 9E FIG. 9F FIG. 9G FIG. 9H

PHOTONIC RESONATOR INTERFEROMETRIC SCATTERING MICROSCOPY

CROSS-REFERENCE TO RELATED APPLICATIONS

This application is a U.S. National Phase of International Application No. PCT/US2022/015023, filed Feb. 3, 2022, which claims priority to U.S. Provisional Application No. 63/188,923, filed May 14, 2021 and U.S. Provisional Application No. 63/146,114, filed Feb. 5, 2021, all of which are incorporated by reference herein in their entirety.

STATEMENT REGARDING FEDERALLY SPONSORED RESEARCH OR DEVELOPMENT

This invention was made with government support under 61313381-118785 awarded by the National Institutes of Health and 2027778 awarded by the National Science Foundation. The United States Government has certain rights in the invention.

BACKGROUND

Interferometric scattering microscopy enables the detection and characterization of individual (bio)nano-objects directly in solution, across length scales that range from tens to hundreds of nanometers, with high spatiotemporal resolution, and without the need for extrinsic labels or elaborate procedural steps. Demonstrations of biomolecular and nanomaterial mass determination, sample heterogeneity analysis, and dynamic molecular binding characterization have been achieved recently by interferometric imaging. In essence, the detected signal is generated by the interference between the object-scattered light and the background reference light, which scales linearly with the object size instead of the square dependence for pure scattering. As a result, interferometric signal contrast relies on the intensity balance between the molecule-induced scattered light and the reference laser beam, apart from the scattering cross section ($\sigma_{sc}$) of the molecule itself. To enhance the contrast, a common practice is to attenuate the overwhelming reference beam by a partial reflective mirror, thin film interference or polarization filtration. However, high illumination intensity is needed for the molecule-scattered photons to overcome background noise. Alternatively, metallic surfaces have been employed to concentrate light by surface plasmon resonances to provide enhanced excitation for scatterers while drastically reducing the background. The dissipative nature of the noble metal surface, however, leads to significant loss of scattered photons that are already scarce, especially in the case of scattering from small molecules. Similarly for noble metal nanoparticles, their contrast can be enhanced by exciting the localized surface plasmon as an alternative approach for enhanced excitation.

SUMMARY

In one aspect, example embodiments provide a method for interferometric scattering microscopy. The method involves directing incident light onto a surface of a photonic crystal (PC). The incident light has a wavelength that couples into a photonic crystal guided resonance (PCGR) mode of the PC such that less than 1% of the incident light is transmitted through the PC as transmitted light. One or more particles are adjacent to the surface of the PC and scatter a portion of the light coupled into the PCGR mode as scattered light. The method further involves forming an image that comprises a pattern of constructive and destructive interference between the transmitted light and the scattered light.

The PC used in the method could be a one-dimensional PC, a two-dimensional PC, or a three-dimensional PC. In some examples, a one-dimensional PC comprises a plurality of grating lines defined by linear ridges and linear grooves formed in a first dielectric material (e.g., $TiO_2$) disposed on a second dielectric material (e.g., an epoxy or other polymeric material), wherein the first dielectric material has a first index of refraction and the second dielectric material has a second index of refraction, and wherein the first index of refraction is higher than the second index of refraction. In such examples, the incident light may be linearly polarized with an electric field direction that is either perpendicular to the grating lines or parallel to the grating lines. In other examples, a one-dimensional PC comprises a plurality of alternating layers of a first dielectric material and a second dielectric material, wherein the first dielectric material has a first index of refraction and the second dielectric material has a second index of refraction, and wherein the first index of refraction is higher than the second index of refraction.

The one or more particles detected by the method could be nanoparticles (e.g., each of the one or more particles could have a size that is less than 100 nanometers). In some examples, the one or more particles could be biomolecules, such as proteins, nucleic acids, lipids, or polysaccharides. In some examples, the one or more particles could be virions, extracellular vesicles, or lipid vesicles. In some examples, the one or more particles are disposed in a liquid medium on the surface of the PC.

The method can further involve capturing, by an image sensor, a time sequence of image frames of the image during an image capture period. Image processing may be performed on the image frames to identify one or more scattering centers that correspond to the one or more particles. In an example embodiment, the image processing involves averaging each image frame with one or more other image frames within a rolling window of N (e.g., with N>1) sequential image frames to generate a plurality of average images; for each average image of the plurality of average images, dividing the average image on a pixelwise basis by a respective, temporally adjacent average image to generate a plurality ratiometric images; and identifying in at least one of the ratiometric image at least one scattering center corresponding to at least one particle of the one or more particles.

In some examples, such as when the one or more particles are disposed in a liquid medium on the surface of the PC, the particles may move during the image capture period (e.g., due to Brownian motion). Such motion may result in a particle moving into the imaged area of the PC, moving out of the imaged area of the PC, or moving within the imaged area of the PC. The motion of a particle can be detected by tracking a particle from one ratiometric image to another. For example, a first-image scattering center could be identified at a first position in a first ratiometric image, and a second-image scattering center could be identified at a second, different position in a second, temporally-adjacent ratiometric image. The first-image scattering center and second-image scattering center could be determined to be sufficiently correlated such that they both correspond to a specific particle that was in motion during the image capture period.

The incident light is directed onto the surface of the PC at an angle of incidence that couples the wavelength into the PCGR mode of the PC. In examples, the angle of incidence is within 10 degrees of normal incidence, within 5 degrees of normal incidence, or within 1 degree of normal incidence.

In example embodiments, the incident light is collimated and linearly polarized.

In example embodiments, an illumination objective (e.g., a non-immersion microscope objective) is used to direct the incident light onto the surface of the PC. The illumination objective is optically coupled to a light source, such as a laser. The light emitted by the light source may be wavelength-filtered and/or linearly polarized (e.g., using a half-wave plate and linear polarizer) to provide a beam that will have either a transverse magnetic (TM) polarization or a transverse electric (TE) polarization at the PC surface before being collimated by the illumination objective.

In example embodiments, an imaging objective (e.g., a non-immersion microscope objective) is used to collect a portion of the transmitted light and scattered light and form the image. The image may be focused onto an image sensor (e.g., a CCD camera), for example, using a relay lens group. A controller may control the image sensor to capture a sequence of image frames of the image at a specified frame rate (e.g., 600 frames per second) during an image capture period.

In example embodiments, the PC used in the method advantageously causes enhanced scattering by the one or more particles as compared to a conventional interferometric scattering microscopy (iSCAT) system (e.g., a system that uses a coverslip as a reference substrate and a partially transmissive gold disk to attenuate a reference beam).

In another aspect, example embodiments provide a system for interferometric scattering microscopy. The system includes a photonic crystal (PC); an illumination objective configured to direct incident light onto a surface of the PC, wherein the incident light has a wavelength that couples into a photonic crystal guided resonance (PCGR) mode of the PC such that less than 1% of the incident light is transmitted through the PC as transmitted light; and an imaging objective configured to form an image that comprises a pattern of constructive and destructive interference between the transmitted light and scattered light, wherein the scattered light is from one or more particles that are adjacent to the surface of the PC and that scatter a portion of the light coupled into the PCGR mode.

The PC used in the system could be a one-dimensional PC, a two-dimensional PC, or a three-dimensional PC. In some examples, a one-dimensional PC comprises a plurality of grating lines defined by linear ridges and linear grooves formed in a first dielectric material (e.g., $TiO_2$) disposed on a second dielectric material (e.g., an epoxy or other polymeric material), wherein the first dielectric material has a first index of refraction and the second dielectric material has a second index of refraction, and wherein the first index of refraction is higher than the second index of refraction. In such examples, the incident light may be linearly polarized with an electric field direction that is either perpendicular to the grating lines or parallel to the grating lines. In other examples, a one-dimensional PC comprises a plurality of alternating layers of a first dielectric material and a second dielectric material, wherein the first dielectric material has a first index of refraction and the second dielectric material has a second index of refraction, and wherein the first index of refraction is higher than the second index of refraction.

The one or more particles detected by the system could be nanoparticles (e.g., each of the one or more particles could have a size that is less than 100 nanometers). In some examples, the one or more particles could be biomolecules, such as proteins, nucleic acids, lipids, or polysaccharides. In some examples, the one or more particles could be virions, extracellular vesicles, or lipid vesicles. In some examples, the one or more particles are disposed in a liquid medium on the surface of the PC.

In example embodiments, the illumination objective is a microscope objective (e.g., a non-immersion objective). The incident light may be light from a light source (e.g., a laser) that has been collimated by the illumination objective. The light source can be optically coupled to the illumination objective, such that the incident light comprises light emitted from the light source that has passed through the illumination objective. In some examples, the light source is optically coupled to the illumination objective via a wavelength-selective filter. In some examples, the light source is optically coupled to the illumination objective via a linear polarizer. In some examples, the light source is optically coupled to the illumination objective via a half-wave plate.

In example embodiments, the imaging objective is a microscope objective (e.g., a non-immersion objective). In some embodiments, the imaging objective is optically coupled to an image sensor (e.g., via a relay lens group) such that the image sensor is able to capture one or more image frames of the image.

In such embodiments, the system may include a controller coupled to the image sensor. The controller is configured to control the image sensor to capture a plurality of image frames of the image at a specified frame rate (e.g., 600 frames per second) during an image capture period.

In such embodiments, the system may also include a computing device coupled to the image sensor (in some implementations, the computing device could also function as the controller of the image sensor). The computing device is configured to perform image processing operations on the plurality of image frames. In example embodiments, the image processing operations involve averaging each image frame with one or more other image frames within a rolling window of N (e.g., with N>1) sequential image frames to generate a plurality of average images; for each average image of the plurality of average images, dividing the average image on a pixelwise basis by a respective, temporally adjacent average image to generate a plurality of ratiometric images; and identifying in at least one of the ratiometric images at least one scattering center corresponding to at least one particle of the one or more particles. In some embodiments, the image processing operations further involve identifying a first-image scattering center at a first position in a first ratiometric image; identifying a second-image scattering center at a second position in a second ratiometric image, wherein the second ratiometric image is temporally adjacent to the first ratiometric image, and wherein the second position is different than the first position; and determining that the first-image scattering center and second-image scattering center both correspond to a specific particle of the one or more particles and that the specific particle was in motion during the image capture period.

In example embodiments, the PC used in the system advantageously causes enhanced scattering by the one or more particles as compared to a conventional interferometric scattering microscopy (iSCAT) system (e.g., a system that uses a coverslip as a reference substrate and a partially transmissive gold disk to attenuate a reference beam).

BRIEF DESCRIPTION OF THE DRAWINGS

The features, objects and advantages other than those set forth above will become more readily apparent when consideration is given to the detailed description below. Such detailed description makes reference to the following drawings.

FIGS. 1A-1G illustrate the fabrication and characterization of an example photonic crystal (PC). FIGS. 1A-1E schematically illustrate aspects of the PC fabrication process. FIG. 1A shows a coverslip substrate after piranha treatment followed by HMDS spin-coating. FIG. 1B illustrates an assembly that includes a quartz mold and UV-curable epoxy on the coverslip. The quartz mold has a nanoscale grating that is transferred to the coverslip by a replica molding process in which the UV-curable epoxy is utilized to form the grating substrate on the coverslip once cured. FIG. 1C shows the assembly during the casting and curing. FIG. 1D shows the cured polymer substrate after peeling it from the quartz mold. FIG. 1E illustrates $TiO_2$ deposition on the cured polymer substrate to form the guiding layer in the PC design. FIG. 1F is an SEM image that shows the transverse profile of the final PC structure. FIG. 1G is an FIB-SEM image that shows the cross-sectional profile of the final PC structure.

FIGS. 2A-2D illustrate photonic resonator interferometric scattering microscopy (PRISM) in accordance with an embodiment of the present disclosure. FIG. 2A schematically illustrates an example PRISM system, where an all-dielectric photonic crystal (PC) is used as the sample substrate and illuminated by a collimated 633 nm HeNe laser beam. The inset within FIG. 2A illustrates normal-incident TM-polarized light that excite the PC guided resonance to enhance the particle-scattered light. The scattered photons then interfere with the 1% transmitted reference beam, resulting in an interferometric signal on the camera. FIG. 2B shows a grey-scale encoded PC transmissivity (transfer function) at laser wavelength as a function of incident wavevector $H(k_x, k_y)$ obtained from numerical simulation (NA=0.70). FIG. 2C shows a normalized near-field electric field profile of a 20-nm diameter gold nanoparticle on the resonant PC substrate. FIG. 2D shows a normalized radiation power distribution of a vertically oriented electric dipole on the surface of a PC resonator.

FIGS. 3A-3G characterize a photonic guided resonance mode of a PC in accordance with an embodiment of the present disclosure. FIG. 3A is a dispersion diagram measured experimentally from the transmission spectrum, overlaid with numerically obtained photonic band structure (dashed white curves). In the upper panel, the laser wavelength $\lambda_L$=633 nm is marked with a dashed line, and the dotted horizontal line marks the normal incidence angle (Γ point). The lower panel illustrates the transmission spectrum (dashed line) at normal incidence along with the normalized laser emission spectrum (broken line) FIG. 3B-3D show experimentally recorded isofrequency contours by Fourier plane imaging, respectively from PCs with $TiO_2$ thickness of 90 nm (FIG. 3B), 97 nm (FIG. 3C), and 105 nm (FIG. 3D). FIG. 3E is a bright field reflection image of the border between the PC nanostructure and the glass substrate. The inset in FIG. 3E is a scanning electron microscopy (SEM) image of the corrugated PC surface. FIG. 3F is PRISM image of the resonating PC sample used to generate FIG. 3C. The majority of the normally incident light is reflected, leaving the PC region appearing black in transmission mode. FIG. 3G is a PRISM image of the detuned PC used to generate FIG. 3D, where the PC region is almost transparent due to resonance wavelength mismatch.

FIG. 4A-4F illustrate an imaging example with gold nanoparticles in accordance with an embodiment of the present disclosure. FIG. 4A shows false-colored SEM images of a PC surface with AuNPs of various sizes. FIGS. 4B and 4C show corresponding differential interferometric images are recorded using a NA=0.95 objective (FIG. 4B) and a NA=1.46 objective (FIG. 4C) for the same AuNPs under PRISM modality. FIG. 4D shows contrast histograms of AuNP signal distribution obtained using a NA=1.46 objective (n>500 for each size of AuNP.) The broadening of the contrast distribution for the 40 nm-AuNPs is likely caused by the formation of multiple-particle aggregates. FIG. 4E includes (in the upper panel) a scatterplot of the signal contrast as a function of AuNP size. Each dot represents the average of 50 instances of AuNP events. The lower panel in FIG. 4E indicates hydrodynamic diameters of the same AuNPs obtained through dynamic light scattering measurements. A clear separation of the hydrodynamic diameter can be seen except for AuNPs below 10 nm in diameter, where the instability of the laser becomes overwhelming compared with the weak NP scattering signal. The DLS measurement for each AuNP size was repeated separately five times. FIG. 4F is a Fourier plane image of the AuNP (d=40 nm) scattered light obtained by averaging the 2D Fourier-transformed images over 6000 frames. The outer circle is equivalent to NA=0.95 in air.

FIG. 5A is an SEM image of an inactivated SARS-CoV-2 virion on the PC substrate. FIG. 5B is a contrast histogram obtained from over 500 individual virus signals. FIG. 5C is a representative interferometric image with additional identifiers (white arrows) for coronaviruses within the field-of-view. FIG. 5D illustrates the distribution of contrast signals from individual ferritin molecules (440 kDa, contrast: 0.88±0.09%) and fibrinogen molecules (340 kDa, contrast: 0.77±0.09%), with n>1000 for each protein molecule. FIG. 5E is a representative interferometric image with additional identifiers (white arrows) for ferritin molecules within the field-of-view.

FIG. 7A illustrates FEM simulated scattering cross section spectra for AuNPs on a resonant PC surface. FIG. 7B is a contour map of the PC enhancement factor on the AuNP scattering cross section as a function of AuNP diameter and excitation wavelength. FIG. 7C is a schematic illustration of the PRISM system (upper drawing) and interferometric scattering microscopy (iSCAT) with a gold disk placed in the Fourier plane to attenuate the reference beam (lower drawing). FIG. 7D are representative differential interferometric images of AuNPs (d=40 nm) obtained by PRISM (left image) and iSCAT (right image). FIG. 7E shows a comparison of signal contrast obtained respectively by PRISM (higher contrast signals) and iSCAT (lower contrast signals), with n>400 for each size of AuNP.

FIGS. 8A-8G illustrate the effect of relative location of a AuNP on a PC substrate. FIG. 8A-8E show the scattering cross section spectrum and the normalized near-field profile for a 20-nm-diameter AuNP located respectively at the ridge center (FIG. 8A), at Λ/8 displacement from ridge center (FIG. 8B), at Λ/4 displacement from ridge center (FIG. 8C), at the groove corner (FIG. 8D), and at the groove center (FIG. 8E). In comparison with a glass substrate (shown in FIG. 8F), the PC provides at least one order-of-magnitude enhancement on AuNP scattering even at the anti-node of the PCGR mode (as illustrated in FIG. 8G).

FIG. 9A-9H illustrate aspects of example image processing for PRISM. FIGS. 9A and 9B are two consecutive images with laser-induced speckle background before and after the arrival of AuNPs (40 nm in diameter). FIG. 9C is a ratiometric image obtained by dividing the image of FIG. 9A with the image of 9B. FIG. 9D is a Gaussian deconvoluted PRISM image in which background noise is significantly suppressed. FIG. 9E is a calculated binary mask of significance indicating the pixels that follow the predefined PSF of the microscopy system (the centroids of interferometric signal are determined by locating the local minimum within each PSF patterns, marked with white cross in FIG. 9G, which can be obtained by overlaying the mask of significance with the local maxima of the Gaussian-of-Laplacian filtered image (FIG. 9F). FIG. 9H shows AuNP trajectories over consecutive frames calculated by a Kalman filter. AuNP trajectories spanning over 500 frames (at 600 frames per second) are shown in FIG. 9H.

Figure 5A:
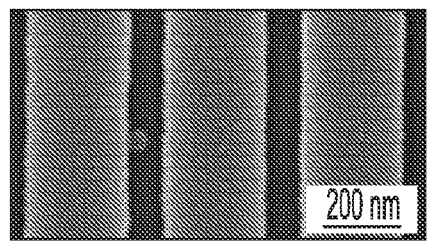
FIG. 5A-5E shows an application of PRISM to detect individual viruses (FIGS. 5A-5C) and protein molecules (FIGS. 5D and 5E) in accordance with an embodiment of the present disclosure.

While the present technology is susceptible to various modifications and alternative forms, exemplary embodiments thereof are shown by way of example in the drawings and are herein described in detail. It should be understood, however, that the description of exemplary embodiments is not intended to limit the invention to the particular forms disclosed, but on the contrary, the intention is to cover all modifications, equivalents and alternatives falling within the spirit and scope of the disclosure.

DETAILED DESCRIPTION

The technology now will be described more fully hereinafter with reference to the accompanying drawings, in which some, but not all embodiments are shown. Indeed, the technology may be embodied in many different forms and should not be construed as limited to the embodiments set forth herein; rather, these embodiments are provided so that this disclosure will satisfy applicable legal requirements.

Likewise, many modifications and other embodiments of the technology described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the disclosure. Although specific terms are employed herein, they are used in a generic and descriptive sense only and not for purposes of limitation.

Unless defined otherwise, all technical and scientific terms used herein have the same meaning as commonly understood by one of skill in the art to which the technology pertains. Although any methods and materials similar to or equivalent to those described herein can be used in the practice or testing of the present invention, the preferred methods and materials are described herein.

1. Introduction

Interferometric scattering microscopy is increasingly employed in biomedical research owing to its extraordinary capability of detecting nano-objects individually through their intrinsic elastic scattering. Embodiments of the present disclosure include photonic resonator interferometric scattering microscopy (PRISM) in which a dielectric photonic crystal (PC) resonator is utilized as the sample substrate. Embodiments of the present disclosure can significantly improve the signal-to-noise ratio without increasing illumination intensity. The scattered light is amplified by the PC through resonant near-field enhancement, which then interferes with the <1% transmitted light to create a large intensity contrast. Importantly, the scattered photons assume the wavevectors delineated by PC's photonic band structure, resulting in the ability to utilize a non-immersion objective without significant loss at illumination density as low as 25 W cm$^{-2}$. An analytical model of the scattering process is discussed, followed by demonstration of virus and protein detection. The results showcase the promise of nanophotonic surfaces in the development of resonance-enhanced interferometric microscopies.

In contrast to their plasmonic counterparts, nanostructured dielectric surfaces such as photonic crystals (PCs), can support a range of extraordinary optical properties without inherent material absorption loss. As the optical analogs to electronic crystals, PCs comprise subwavelength periodic structures that resonate with photons, resulting in light confinement and photonic band structure. For instance, dielectric nanophotonic surfaces exhibiting certain topology symmetries can support high-quality-factor (Q) supercavity modes with a near-zero radiation channel to free space, also known as the quasi bound state in the continuum (BIC). In addition, due to the strong correlation between the structure of the PC and its dispersion relation, PCs can be structurally tailored to realize various modulation transfer functions in the wavevector domain and employed for optical analog image processing, such as k-space filtering, image differentiation, and hyperspectral imaging.

In embodiments of the present disclosure, we show that these combined characteristics of PCs yield a multifunctional platform for the implementation of interferometric scattering microscopy: the reference beam intensity can be significantly reduced by the photonic band edge, while the built-in optical resonances can be exploited to enhance light-matter interaction.

Example embodiments of the present disclosure include photonic resonator interferometric scattering microscopy (PRISM) based upon an all-dielectric nanophotonic surface for the quantitative detection of individual nano-objects such as nanoparticles, viruses, and biomolecules. In place of an ordinary glass slide, a nanostructured PC surface (e.g., 1×1 cm) is directly used as an optically resonant substrate in a transmission laser microscope (e.g., as illustrated in FIG. 2A).

2. Example Photonic Crystals

One-dimensional, two-dimensional and three-dimensional photonic crystals (PCs) have been fabricated from a range of dielectric materials. In one approach, the PC comprises a one-dimensional (1D) or two-dimensional (2D) periodic surface structure (e.g., a 1D or 2D grating structure) formed from a low refractive index dielectric material that is overcoated with a high refractive index (RI) dielectric material. In an alternative approach, the PC comprises an alternating sequence of layers of low-RI and high-RI materials. This type of PC may be described as a 1D multilayer PC or a Bragg reflector.

In an example embodiment, the PC comprises a $TiO_2$-coated periodically corrugated polymer surface, fabricated on a coverslip by a low-cost replica molding process. This type of PC can be fabricated as illustrated in FIGS. 1A-1E. As shown in FIG. 1A, a coverslip is piranha cleaned and then spin-coated with hexamethyldisilazane (HMDS). As shown in FIG. 1B, a UV-curable epoxy is applied in liquid form on one side of the coverslip, and a quartz mold is brought into contact with the liquid epoxy in a replica molding process. The quartz mold is patterned so as to form the nanoscale periodic surface structure of the PC. In this case, the periodic surface structure is a 1D grating structure with linear ridges and linear grooves. As shown in FIG. 1C, the quartz mold is in contact with the epoxy while the epoxy is cured. The cured epoxy is then peeled off the quartz mold. As shown in FIG. 1D, the cured epoxy has the 1D grating structured imparted from the quartz mold. TiO$_2$ is then deposited on the cured polymer (epoxy) substrate to form the guiding layer in the PC design. FIG. 1E is a cross-sectional schematic view of the resulting PC. The linear ridges and linear grooves extend perpendicularly to the page. FIG. 1F is a scanning electron microscope (SEM) image of the PC, showing the linear ridges (wider lines) and linear grooves (narrower lines) of the PC surface. FIG. 1G is a focused ion beam scanning electron microscopy (FIB-SEM) image of the cross-sectional profile of the final PC structure. Various parameters used for numerical simulation of the PC structure are shown overlaid on the FIB-SEM image. In this example, the parameters are as follows: $\Lambda=390$ nm, $f_1=0.60$, $f_2=0.55$, $f_3=0.74$, $d_1=97$ nm, $d_2=67$ nm, $d_3=100$ nm.

The PCs used in the studies described herein were fabricated using a low-cost replica molding technique. A quartz molding template with the grating structure (390 nm period, 100 nm height) was fabricated using deep-UV lithography and reactive ion etching (Molecular Imprints). As the substrates for PCs, 20×60 mm coverslips (Electron Microscopy Science) were rinsed with acetone, isopropyl alcohol (IPA) and deionized water, followed by a piranha bath for more than 3 hours. The piranha-cleaned coverslips were then rinsed with deionized water and dried under a continuous stream of nitrogen gas. After an oxygen plasma treatment at 500 mT and 200 W for 10 minutes, a layer of HMDS (Shin-Etsu MicroSi) was spin-coated at 3000 rpm for 30 s, and baked at 100° C. for 1 min. Then, 5 µL of UV-curable epoxy was drop-cast on the quartz mold and covered by a pretreated coverslip, followed by a 40 s exposure under a 500 W UV lamp (Xenon RC-600). The cured replicas were gently lifted from the quartz mold and deposited with a layer of TiO$_2$ (97 nm thickness) using a reactive RF sputtering system (Kurt Lesker PVD 75). The PCs were stored in a coverslip case filled with nitrogen gas.

3. Physical Principles of PRISM

When a monochromatic plane wave incident on the PC satisfies the phase-matching condition, the PC will efficiently trap light through a photonic crystal guided resonance (PCGR), reshaping the optical near-field interaction and far-field propagation. In accordance with described embodiments, PCs provide at least three advantages for interferometric microscopy of nanoparticles. Those three advantages are described below in the context of the example PRISM system illustrated in FIG. 2A.

First, for laser excitation, the PC functions as a notch filter centered in lieu of a partial reflective mirror. Near-unity back reflection and near-zero transmission can be obtained at resonance via a sharp Fano interference. For the transverse magnetic (TM) polarized plane wave at the wavelength $\lambda_0=633$ nm, the corresponding modulation transfer function $H(k_x, k_y)$ is obtained as the theoretical PC transmittance in the wavevector domain (FIG. 2B). Specifically, when the PC is illuminated by a collimated beam at normal incidence (Γ-point), less than 1% of the incident light is allowed to transmit and interferes at the image plane with the light scattered by nano-objects on the surface. As a result, the intensity of the reference beam is substantially reduced in the interferometric system.

Second, by effectively trapping light in the resonant substrate, the PC provides nearly two-orders-of-magnitude enhanced excitation for the nanoscale scatterers via near-field coupling (FIG. 2C). This is achieved by the excitation of a pair of counterpropagating leaky modes in the corrugated TiO$_2$ guiding layer, from which stationary wave patterns are formed, and a strong evanescent field at the water-TiO$_2$ interface is induced.

Third, the PC redistributes the light scattered from the nanoparticle angularly and thus improves the collection efficiency into the imaging objective lens. In addition to direct out-of-plane scattering, scattered light can be collected into in-plane guided modes, where it temporally recirculates in the PC resonator and eventually radiates into the lower substrate due to the nature of leaky modes. Through a point-dipole approximation for an individual nanoparticle (NP), this scattering behavior can be more clearly demonstrated by the radiation power profile of a vertically oriented electric dipole on the PC surface (FIG. 2D). It is noteworthy that the radiated (scattered) light is predominantly (>78%) radiated into the substrate, whose refractive index ($n_{TiO2}=2.38$) is much larger than that of the superstrate ($n_{water}=1.33$). The PCGR-induced background suppression, enhanced excitation and improved light extraction simultaneously enable the direct observation of nanoscale scatterers with a non-immersion (NA<1) objective without significant loss of contrast signal at relatively low luminance. As a result, PRISM enables convenient noncontact-objective imaging and larger field of view.

To experimentally validate the physical principles underlying PRISM, the band structure of the fabricated PC is first obtained via a far-field transmission spectrum measurement (FIG. 3A). For the measurement of PC transmission spectra under specific incident angles $\theta_{inc}$, a water-immersed sample was mounted on a fine-resolution rotation stage, with the PC gratings parallel to the rotational axis. Collimated TM-polarized white light from a tungsten halogen lamp (Ocean Optics LS-1) was incident onto the PC surface (illumination area ~5 mm$^2$), with the incident angle adjusted by the motorized rotation stage. The zero-order transmitted light was collected by a fiber collimating lens and guided by an optical fiber into a spectrometer (Horiba iHR550).

We also computed the band structure and derived the modulation transfer function $H(k_x, k_y)$ using both finite-element method (FEM) and finite-difference method in time-domain (FDTD) to cross-validate the calculated results in prevention of simulation artifacts. Three-dimensional FEM and FDTD simulations were performed using commercially available packages (COMSOL Multiphysics and Lumerical FDTD). The fidelity of the fabricated PCs was validated by Focused Ion Beam SEM (Thermal Scientific Scios 2 DualBeam) where the cross-section profile is obtained. The parameters described above in relation to FIG. 1G were used in the simulations. The unit cell in simulation consisted of one primitive PC period (390 nm) in the transverse direction imposed with Floquet periodic boundary conditions, while perfectly matched layer (PML) boundary conditions were imposed for the vertical direction. The refractive index of TiO$_2$ was taken from Siefke, T. et al., "Materials pushing the application limits of wire grid polarizers further into the deep ultraviolet spectral range," *Advanced Optical Materials* 4, 1780-1786 (2016). The refractive indexes of the glass substrate ($n_{glass}$=1.510) and the UV curable epoxy ($n_{epo}$=1.464) were referenced from the manufacturers. The band structure obtained from both FEM and FDTD shows good agreement with the experimental dispersion diagram (FIG. 3A). For FEM simulation of the resonance-enhanced scattering, the AuNP was modelled as a spherical structure with the refractive index taken from Johnson, P. B. & Christy, R. W., "Optical constants of the noble metals," Physical review B 6, 4370 (1972). The mesh size at the NP is smaller than one tenth of the particle diameter. Using the wave optics module, the full field solution under Floquet periodic conditions was first calculated to simulate the field profile of a pristine extended PC resonator, which was then used as the background field for AuNP excitation and the previous Floquet periodic boundary conditions were replaced by PML boundary conditions to prevent the back-scattered field from the computational boundary.

Quantitative agreement between the experimental results and the simulation modelling for the two branches of the PCGR mode (white dashed lines in FIG. 3A) are observed. Here, we focus on the long-wavelength resonance branch for its low transmissivity (0.764%) and high quality factor (Q=452.61). The PCGR resonance wavelength at normal incidence can be accurately tuned to match the HeNe laser wavelength ($\lambda_0$=633 nm) by controlling the thickness of the deposited $TiO_2$ layer (lower panel, FIG. 3A). To verify the modulation transfer function $H(k_x, k_y)$, the angular diagram of the PC transmissivity at the laser wavelength is obtained through Fourier plane imaging. FIG. 3C shows the obtained Fourier space images of a representative PC used in the PRISM system, where the isofrequency contours outlining the dispersive PCGR mode can be clearly observed, in good agreement with the predicted modulation transfer functions (FIG. 2B). The measured modulation transfer function $H(k_x, k_y)$ can be understood as a slice on the saddle-shaped photonic band (due to the anisotropic photonic lattice) in the wavevector plane ($k_x$, $k_y$) of constant frequency $\omega_0$ (red dotted line in FIG. 3A). For the detuned PCs, the photonic band is slightly shifted in the frequency axis and the corresponding isofrequency contours are therefore also offset from the saddle point (FIGS. 3B and 3B).

One of the benefits of PCs in embodiments of the microscopy system is that the background can be suppressed under normal incidence by virtue of the PCGR mode, without the need for illumination beyond the critical angle or additional modulation in the Fourier plane, therefore reducing the complexity of the imaging system. To demonstrate this capability, customized transmission illumination was added onto a conventional inverted microscope for the PC to be illuminated by a collimated TM-polarized beam from a 21 mW HeNe laser (FIG. 2A). For bright field observation, the edge of the representative PC nanostructure was illuminated with 625 nm TM-polarized light from a light-emitting diode (LED), and inspected under reflection mode. Assisted by an oil-immersion objective (NA=1.46), the horizontally aligned PC gratings (period A=390 nm) are observable, and the brightness validates the high reflectivity of the PC in comparison with the adjacent glass substrate (FIG. 3E). When observed under transmission mode with laser illumination, the same PC region showed significantly lower background intensity than the adjacent glass substrate, as expected from the obtained transfer function in the wavevector domain. A slightly detuned PC, on the other hand, remains highly transmissive owing to the sharp Fano lineshape of the resonance mode.

4. Example Optical Instrumentation

FIG. 2A illustrates an example PRISM system. The system was custom-built on top of the body of a commercial inverted microscope (Zeiss Axio Observer 7). A collimated polarized laser beam from a 21-mW red HeNe laser (Thorlabs HNL210LB) was expanded by a relay lens group (shown as L1 and L2 in FIG. 2A) and filtered by a laser line filter (Thorlabs FL05632.8-1) shown as FIL in FIG. 2A. A half-wave plate (shown as $\lambda/2$ in FIG. 2A) was used to control the polarization axis while a linear polarizer (shown as P in FIG. 2A) set the incident field to be TM-polarized (i.e., the electric field of the incident light was perpendicular to the linear ridges and linear grooves of the PC). A doublet (shown as L3 in FIG. 2A) focused the expanded beam (via a mirror M1) onto the back focal plane of an illumination objective (Olympus LMPLFLN50×), which is shown as IL OBJ in FIG. 2A. The illumination objective collimates the beam, and the collimated beam directly impinged on the sample (e.g., a water-immersed PC substrate mounted on a rotational stage). The partially transmitted laser beam, along with the object-scattered light, was collected by an imaging objective, shown as OBJ in FIG. 2A, and focused on one of the side ports via a mirror (M2) and a tube lens (n). Two different imaging objectives were used in the studies described herein: a non-immersion objective (Zeiss Plan-Apochromat 40×/0.95) and an oil-immersion objective (Zeiss Plan-Apochromat 100×/1.46 Oil DIC). The focused light was relayed by a 1× lens group (shown as L4 and L5 in FIG. 2A) onto a charge coupled device (CCD) camera (FLIR GS3-U3-23S6M), with a resolution of 57 nm/pixel and a field-of-view of 14.6×14.6 µm under the 100× objective. A compact power meter (Thorlabs PM16-120) was mounted on a side port for transmission power monitoring. The CCD camera can be controlled by a controller, which may include a computing device.

The PRISM system was also set up for conventional interferometric scattering as follows. A 1× relay lens group was mounted on the third microscope side port but with a gold disk attenuator placed at the Fourier plane between the two lenses (as shown in the lower drawing of FIG. 7C), and a CCD camera (FLIR GS3-U3-23S6M) captured the interferometric image. During imaging experiments, custom software was used for live streaming both the raw side port images and the differential interferometric images simultaneously to locate the correct focal plane. Once identified, the focal position was secured by an autofocus module where an infrared beam was constantly measuring the objective-to-surface distance.

The gold disk attenuator used in the studies described herein was fabricated as follows. A 25 µm thick adhesive film (3M 8211OCA) with a 2 mm hole at the center was attached to a piranha-cleaned N-BK7 optical window (Thorlabs WG11010). The masked N-BK7 window was deposited with 5 nm of Titanium followed by 100 nm of gold (Temescal Ebeam evaporator 4). With the adhesive stripped by acetone, the dot attenuator was measured to have a transmissivity of 0.65%.

For the Fourier plane imaging described herein, a TM-polarized collimated beam from a 0.8 mW red HeNe laser (Thorlabs HNLS008L) was condensed by an objective (Olympus RMS40X-PF) on the water-immersed PC substrate mounted on the rotational stage, while the transmitted light was collected by a lens group (NA≈0.35) to project the Fourier plane on a CCD camera (FUR GS3-U3-23S6M).

5. PRISM Detection of Gold Nanoparticles

To explore the relationship between scattered signal image contrast and the size of the scattering object, we collected PRISM images of spherical gold nanoparticles (AuNPs) ranging in diameter from 5 nm to 40 nm. The studies used surfactant stabilized AuNPs (Cytodiagnostics) that were used as received without further surface modifications and diluted to $1.0\times10^{10}$ NPS/mL with molecular grade water. For generality of results as applied to nanoparticles comprised of alternative materials, the laser wavelength is offset from the localized surface plasmon resonance (LSPR) wavelength of the AuNPs by at least 100 nm, preventing the synergistic coupling between the photonic resonator and the plasmonic resonator. To verify the size of the AuNPs, both scanning electron microscopy (SEM) and dynamic light scattering (DLS) measurements were utilized as AuNP characterization. SEM images of AuNPs on the PC substrate are shown in FIG. 4A. For PRISM imaging, 20 μL of AuNPs solution (diluted to $1.0\times10^{10}$ NPS/mL with molecular grade water) was dispensed on the PC substrate and sealed with a Piranha-cleaned coverslip, and individual AuNP binding/unbinding events were recorded at an acquisition rate of 600 frames-per-second (FPS). With the coherence-induced speckle background removed by rolling-window averaging, representative images in FIGS. 4B and 4C show the contrast signals from single AuNPs observed respectively with a 40× air objective (NA=0.95) and a 100× oil immersion objective (NA=1.46). A Laplacian-of-Gaussian (LoG) filter is applied to localize the center of every AuNP signal within each frame, followed by a single-particle tracking algorithm to obtain the lateral AuNP trajectories. Further details regarding the image processing are provided below. The averaged contrast signal within each trajectory is considered as a single instance. From over 500 instances for each size of the AuNP recorded by the 100× objective, we constructed contrast histograms reflecting the distribution of interference signal dependent on the AuNP size/mass (FIG. 4D). In addition, the magnitude of the AuNP contrast signal recorded by the non-immersion 40× objective remains largely unchanged (FIG. 4E), indicating the scattering profile is confined to smaller angles, in contrast to the detection of a nanoscopic scatterer/emitter on a glass substrate where an immersion objective (NA≤1.0) is required. Interestingly, on top of a NA-dependent Airy disk pattern as commonly reported in the conventional interferometric microscopy, the real-space AuNP signal pattern also includes a semi-parabolic pattern (FIG. 4F inset), implying additional k-space information carried by the scattered photons.

To extract the directionality as well as the angular distribution of the scattering profile of AuNPs on a resonant PC substrate, we performed Fourier transformation on over 6000 frames of the aforementioned interferometric image and obtained an averaged Fourier plane image (FIG. 4F). Despite the overlay of the shifted patterns caused by the laser-induced interference background, it is observed that a portion of the AuNP-scattered photons radiate into the far-field following the angular distribution described by the isofrequency contour $H(k_x, k_y)$ in FIG. 3C. This result indicates that photons scattered from a NP can preferably couple into PCGR modes, consistent with the cavity-enhanced scattering reported elsewhere. The isofrequency contours of these wavevectors are largely confined to the low-NA regime (NA≤0.95), which explains the unaffected NP contrast signals by an air objective (FIG. 4E).

6. PRISM Detection of Proteins and Virions

As a demonstration of PRISM imaging of a biological nanoparticle, we evaluated detection of individual SARS-CoV-2 viruses. The studies used γ-irradiated SARS-CoV-2 virions from BEI Resources and stored at −80° C. Freshly thawed SARS-CoV-2 stock solution was diluted to $5\times10^6$ pfu mL$^{-1}$ with PBS solution and immediately added onto the PC. For each interferometric scattering microscopy measurement, 20 μL of sample solution was directly added onto the PC surface and sealed with a piranha-cleaned coverslip. Clamped onto the sample stage, the PC was illuminated by the normal-incident laser beam and the transmitted power was measured to ensure the quality of resonance, followed by the autofocus procedure, and movies of 10 s duration were recorded.

Figure 5B:
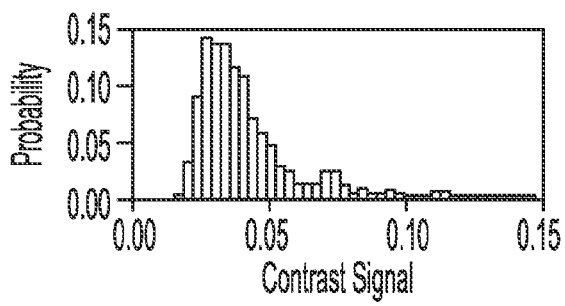
Figure 5D:
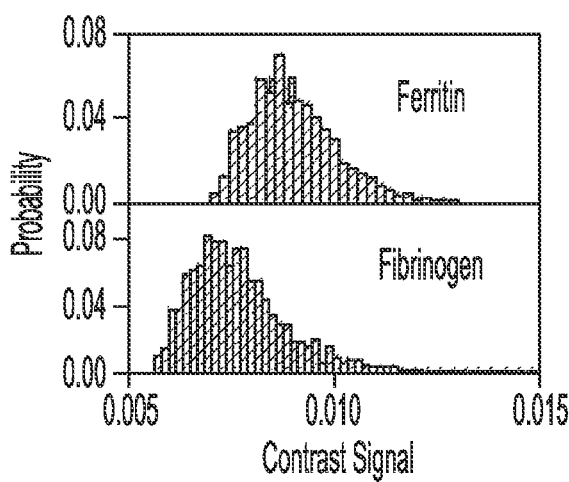
Figure 5C:
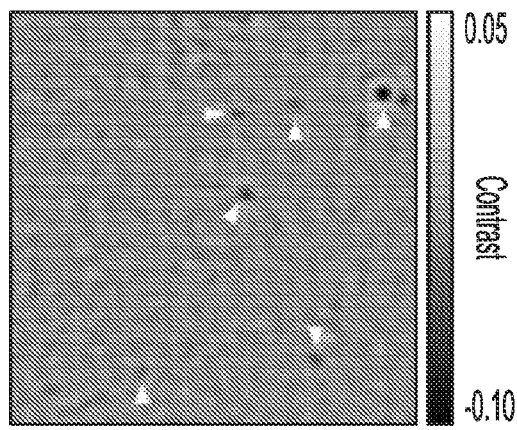

The gamma (γ)-irradiated SARS-CoV-2 viruses were first imaged using SEM to characterize the virus morphology and physical dimension (d=50.61±7.97 nm, FIG. 5A). Diluted to $1\times10^6$ pfu mL$^{-1}$ with phosphate buffer saline (PBS) solution, the SARS-CoV-2 sample was directly introduced on the PC surface and observed under PRISM (FIG. 5C). The diffusion of virions was recorded within the field of view (14.6×14.6 am), and a high SNR contrast signal of ~−4.55% was obtained from more than 500 virions (FIG. 5B). While the experiment records the presence of virions that transiently encounter the PC surface and their path along the PC surface during Brownian motion, we anticipate the use of selective capture molecules immobilized on the PC surface that can recognize outer surface features on the virus and bind the virus so that it will remain stationary.

Figure 5E:
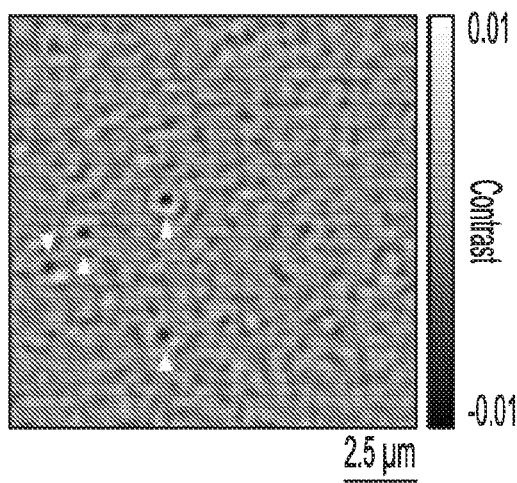

Finally, to demonstrate the capability for PRISM to detect individual biological molecules, we exposed the PC surface to solution containing large proteins, specifically ferritin (MW=440 kDa) and fibrinogen (MW=340 kDa). The ferritin and fibrinogen were purchased directly from Sigma-Aldrich and diluted to 100 nM with PBS solution. The ferritin and fibrinogen in buffer at concentrations of 100 nM were exposed to a bare PC substrate while recording PRISM image sequences at 600 FPS with 10-frame averaging. Representative images show individual protein molecules with contrast ranging from −0.5% to −1% (FIG. 5D). The histogram of signal intensity obtained from over 1000 transient surface scattering events reflects the separation of contrast distribution between the two protein molecules attributed to the mass difference (FIG. 5E). Since the background contrast is measured to be 0.20%, the detection limit of the current PRISM system is estimated to be 185 kDa.

Figure 6:
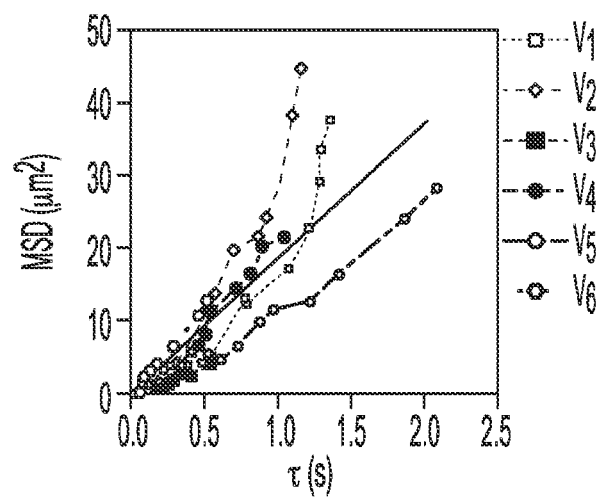
FIG. 6 illustrates the measurement of mean-squared displacement (MSD) versus time (τ) for SARS-CoV-2 virions.

Nanoparticles in a liquid medium can move into, out of, and within the field of view, for example, due to Brownian motion. PRISM imaging can be used to characterize such motion by tracking nanoparticles from one image to another over time. As an example, six separate SARS-CoV-2 virions ($V_1$-$V_6$) were respectively traced and their mean-squared displacements (MSDs) versus time (τ) were calculated. The results are illustrated in FIG. 6. The averaged diffusion constant is found to be 10.24 μm$^2$/s, with a standard deviation of 4.51 μm$^2$/s. The estimation on the SARS-CoV-2 diffusion constant falls within the expected value for the Brownian motion of virus in water at 20° C.

7. Enhancement of Scattering Cross Section

Figure 7A:
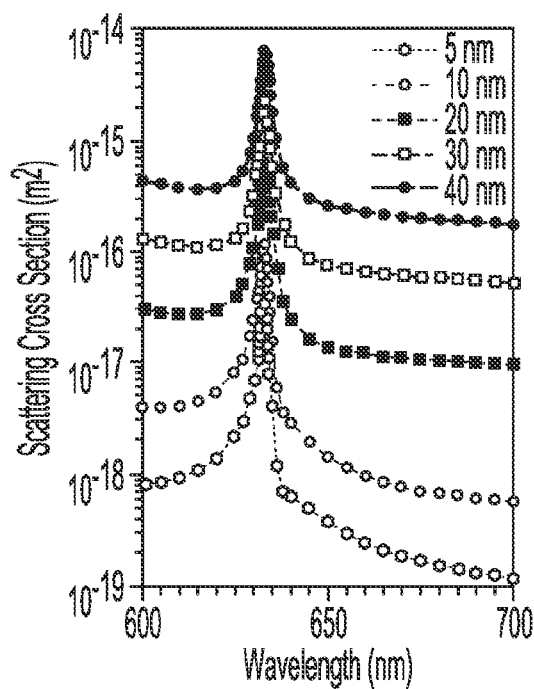
FIG. 7A-7E illustrate modelling and validation on guided resonance enhanced scattering in accordance with an embodiment of the present disclosure.
Figure 7B:
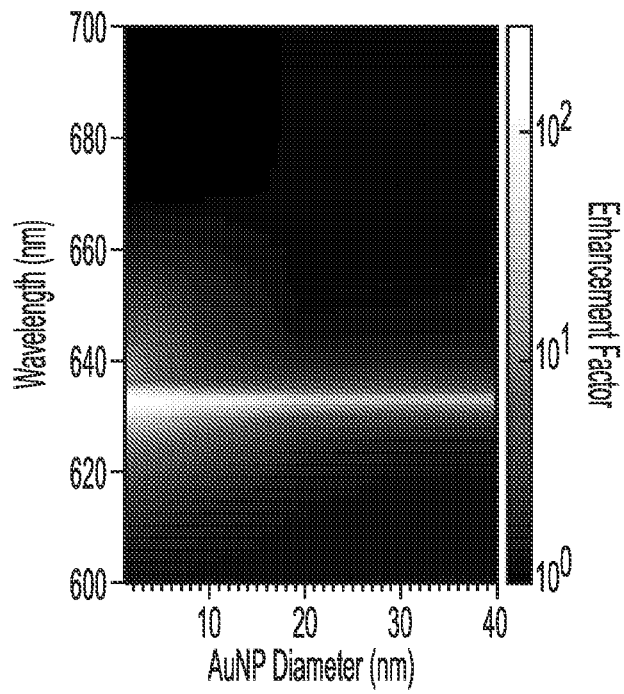

The physical picture of the PC-nanoscatterer interaction can be delineated by temporal coupled-mode theory (TCMT). The PC is treated as a resonator (resonant frequency $\omega_0$, radiative decay rate $\gamma_r$), and allowed to couple with the non-resonant NP antenna (scattering damping rate $\gamma_{sc}$). Here, absorption by the pristine PC resonator is neglected considering the low-loss property of dielectric material. The NP antenna is decoupled from free space radiation as its near-field interaction with the PC resonator is significantly stronger in comparison. Assuming a mirror-symmetry system, we obtain the resonator-mediated NP-scattered light as $$\frac{P_{sc}}{P_{in}} = \frac{2\gamma_r \gamma_{sc}}{(\omega - \omega_0)^2 + (\gamma_r + \gamma_{sc})^2} \quad (1)$$

where $P_{sc}$ and $P_{in}$ in are respectively the scattered power and the incident power. From Equation (1), it is indicated that the scattering signal follows a sharp Lorentzian lineshape centered near the PCGR resonant frequency. The scattering cross section $\sigma_{sc}$ for AuNPs obtained through FEM simulation exhibits good agreement with our analytical prediction, with a broadband background attributed to the onset of the AuNP plasmonic resonance mode (FIG. 7A). It can also be observed from Equation (1) that the NP scattering efficiency is maximized when the radiative decay rate of the PC resonator matches the effective damping decay rate of NPs ($\gamma_r = \gamma_{sc}$). In comparison with a layer of solitary AuNPs, the PC-enabled scattering cross section enhancement ratio at resonance can be obtained as $$\Lambda(\omega_0) = \frac{2\lambda_0 \alpha}{\pi n d_e} \frac{\gamma_r}{(\gamma_r + \gamma_{sc})^2} \quad (2)$$

where $\lambda_0$ is the resonant wavelength, $\alpha$ is the energy confinement of the PC mode in the NP layer, n is the refractive index of water and $d_e$ is the effective length of the evanescent field. As the intrinsic scattering power of the NP scales with the sixth power of its radius, the scattering damping rate $\gamma_{sc}$ approaches the radiative decay rate $\gamma_r$ with decreasing size; therefore, the PC-enabled scattering cross section enhancement ratio is also a function of NP size. This volume-dependent relationship is best captured in FIG. 7B, where the amplification of AuNP scattering cross section by the resonating PC substrate is obtained in comparison with that of a glass substrate. In general, AuNPs exhibit at least one-order-of magnitude enhancement in the scattering cross section, but for smaller NPs ($d_{AuNP}$=5 nm) the cross section can be amplified by as much as 287 times.

Figure 7C:
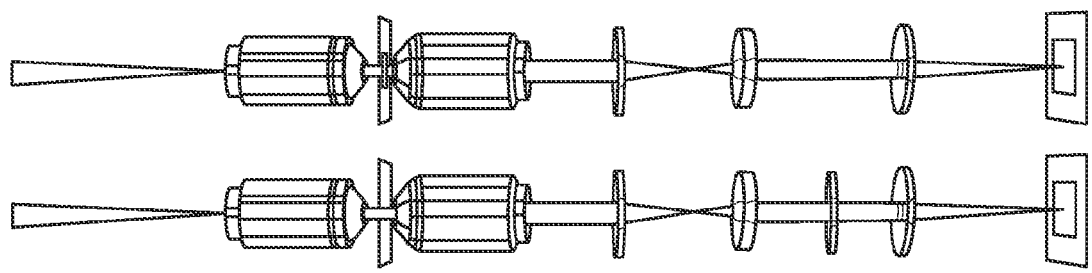
Figure 7D:
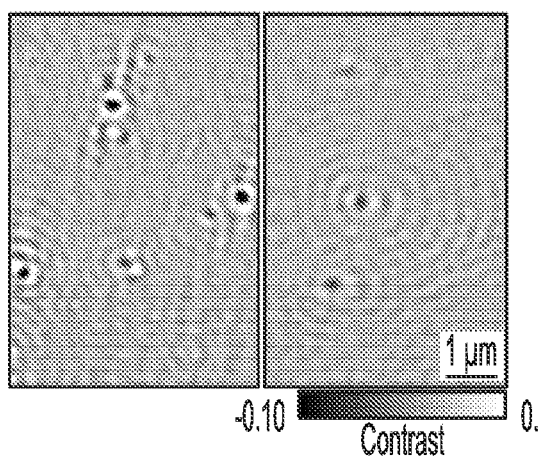
Figure 7E:
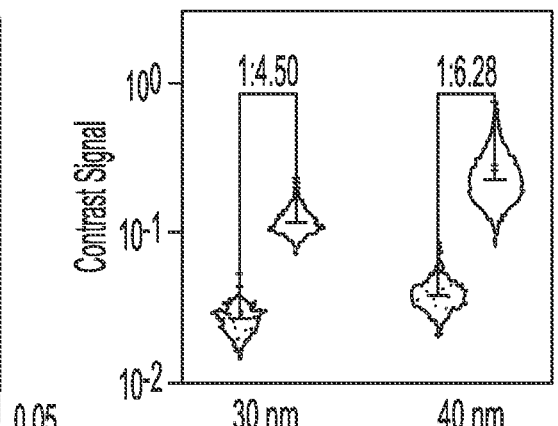

The scatter enhancement by the PC resonator is experimentally validated by the AuNP contrast comparison between the PRISM system and a conventional interferometric system (iSCAT), where coverslips are used as the reference substrate and a partially transmissive (T≈1%) gold disk is placed at the center of the Fourier plane for the attenuation on the reference beam (as shown in the lower drawing of FIG. 7C). Under the same illumination intensity (25 W cm$^{-2}$) and frame rate (600 FPS), interferometric images of water-suspended AuNPs were recorded and compared to demonstrate the ability of the resonant substrate to amplify the scattering signal (FIG. 7D). The signal contrast, measured at the centroid of the scattering pattern over 400 individual instances, was significantly improved when imaging with the on-resonant PC as the substrate by PRISM (FIG. 7E). Only AuNPs of 30 nm and 40 nm in diameter are compared here since the contrasts of smaller AuNPs by the partially transmissive disk are overwhelmed by the background noise. In hindsight, the contrast of the interferometric signal can be described as follows $$C = 2\frac{E_{sc}}{E_r} \cos\phi \quad (3)$$

where $E_{sc}$ and $E_r$ represent the electric field of the scattered light and the reference light, while $\phi$ is the phase difference between $E_{sc}$ and $E_r$. Therefore, the scattering signals from the two microscopy systems can be directly compared as long as the reference beam intensity remains constant. Our FEM calculation results predict that the PCCR offers a 28-fold amplification on $\sigma_{sc}$ for AuNPs (d=30 nm, 40 nm), or a 5.29-fold enhancement in terms of scattered electric field intensity (FIG. 7B), which is in good agreement with the experimentally obtained contrast amplification (FIG. 7E).

In addition, it is noteworthy that the PC enhancement on the AuNP scattering is dependent on the relative NP location within one PC period, where the edge of the PC ridge provides more scattering enhancement due to the higher near-field intensity of the PCGR mode at the edge. This is illustrated in FIGS. 8A-8G. FIGS. 8A-8E show the scattering cross section spectrum and the normalized near-field profile for a 20-nm-diameter AuNP located respectively at the ridge center (FIG. 8A), at Λ/8 displacement from ridge center (FIG. 8B), at Λ/4 displacement from ridge center (FIG. 8C), at the groove corner (FIG. 8D), and at the groove center (FIG. 8E). For comparison, FIG. 8F shows the scattering cross section spectrum and the normalized near-field profile for a 20-nm-diameter AuNP a glass substrate. As shown in FIG. 8G, the PC provides at least one-order-of-magnitude enhancement on AuNP scattering even at the anti-node of the PCGR mode. The location sensitivity of PC enhancement on scattering is closely related to the PCGR near-field profile, where maximum enhancement is achieved at the edge of the PC ridge. This location sensitivity explains the broadened PRISM signal distribution for AuNPs in comparison with the DLS measurement results (FIG. 4E) and with the iSCAT measurement (FIG. 7E).

8. Example Image Processing

All image analyses for PRISM were performed in Matlab (MathWorks) with custom software. The image processing algorithm was adapted from previously reported methods: Aguet, F., Antonescu, C. N., Mettlen, M., Schmid, S. L. & Danuser, G., "Advances in analysis of low signal-to-noise images link dynamin and AP2 to the functions of an endocytic checkpoint," *Developmental cell* 26, 279-291 (2013) and Lee, I. B. et al., "Interferometric scattering microscopy with polarization-selective dual detection scheme: Capturing the orientational information of anisotropic nanometric objects," *ACS Photonics* 5, 797-804 (2017).

All of the captured frames obtained from the camera were saved as individual raw images, for a typical observation window of 10 s, more than 6000 raw images were recorded for later analysis. The image processing procedure contains three major steps.

Step 1: A rolling-window averaging method was applied to remove the background by the virtue of the dynamic measurement. With the window size defined as N, each frame of the raw images was averaged with the following N-1 frames, followed by a ratiometric process where every average image was divided pixelwise by the following average image. For the gold nanoparticle (AuNP) characterization as well as SARS-CoV-2 virion detection, we simply set the rolling window size as 1. Therefore, the ratiometric image is simply the direct division of two consecutive frames, for example, as shown in FIG. 9A-9C. However, the window size was set at 10 for the protein detection in order to suppress the background noise.

Step 2: Detection of individual scattering signals is obtained by the microscope point spread function, which was approximated by a 2D Gaussian function for practicality. For each frame of ratiometric image, a LoG filter is first applied to identify the local minima, followed by a 2D Gaussian function fitting. A t-test analysis is performed to select only the signals significantly higher than the background noise. Localization of signal centroids is determined with a LoG filter, which in combination with Gaussian fitting method can achieve sub-pixel accuracy.

Diffraction-limited PRISM signals are most accurately detected by point spread function (PSF) deconvolution. The airy-disk PSF function can be approximated as a 2D Gaussian function for in-focus scatterers/emitters:

$$g(x;\mu)=\exp(-((x_1-\mu_1)^2+(x_2-\mu_2)_2)/2\sigma^2) \quad (A)$$

where $x=[x_1,x_2]$ is the spatial coordinate within the image, $\mu=[\mu_1, \mu_2]$ is the coordinate of the location of the point source, and the standard deviation $\sigma$ is a predetermined parameter by the objective in use. Therefore, the ratiometric images were modelled as the PSF-convoluted images with additional Gaussian noise:

$$h(x;A,c)=Ag[x;\mu]+c+n[x] \quad (B)$$

where A and c are respectively the amplitude and the background intensity of the interferometric scattering signal, while n[x] is the background Gaussian white noise which follows $N(0, \sigma_n^2)$. Consequently, the estimation on A and c on each candidate signal location $k=[k_1, k_2]$ within each specific ratiometric image f[x] obtained in step (A) can be implemented by $$\min v = \min \sum_{x \in S}(h(x; \mu, A, c) - f(k-x))^2 \quad (C)$$

where S is the $4\sigma$ area centered at the candidate location k. Here, the candidate locations of scattering signals are obtained from the local minimum of the Laplacian-of-Gaussian (LoG) filtered image where sharp changes in the image are highlighted, as shown in FIG. 9F. To solve Equation (C), we equate the derivative of Equation (B) with respect to A, c to zero, which yields:

$$\hat{A}[k] = \frac{\sum_{x \in s} f[k-x]g[x] - \left(\sum_{x \in s} g[x]\right)\left(\sum_{x \in s} f[k-x]\right)/p}{\sum_{x \in s} g[x]^2 - \left(\sum_{x \in s} g[x]\right)^2/p} \quad (D)$$

$$\hat{c}[k] = \frac{\sum_{x \in s} f[k-x] - \hat{A}[k]\sum_{x \in S} g[x]}{p} \quad (E)$$

where p is the total pixel number in S. A representative denoised image obtained through this process is shown in FIG. 9D. The identification on significant signals is achieved by performing a t-test on each of the candidate signals:

$$T(k) = \sqrt{p} \frac{\hat{A}[k] - \kappa \sigma_n[k]}{\sqrt{\sigma_A^2[k] + \kappa^2 s_n^2[k]}} \quad (F)$$

where $\kappa=\sqrt{2}\text{erf}^{-1}(1-2\alpha)$, a is the significance level ($\alpha<0.01$ in the data analysis), $\sigma_A$ is the uncertainty on $\hat{A}[k]$ obtained from error propagation, and is the uncertainty on a n from the standard error of variance. By selecting the pixels whose p-values are lower than a, we can obtain the mask of significance highlighting the centers of scattering signals, as shown in FIG. 9E. Finally, by overlaying the mask of significance with the local maximum of the Gaussian-of-Laplacian filtered image, the centroid of each scattering signal can be effectively captured, as indicated in FIG. 9G.

Step 3: Following the detection of scattering signals within each frame, a single-particle tracking algorithm was utilized to obtain the trajectory information based on the previously obtained centroid coordinates and frame number. Here, we assume that one signal can at most link to one signal in another frame, and no merging or splitting is allowed. A typical image containing AuNP trajectories is shown in FIG. 9H.

9. Conclusion

Embodiments of the present disclosure include a type of interferometric scattering microscopy implemented by using a large-area PC resonator as the imaging substrate. The numerical simulation and theoretical modelling of the PC resonator and its interaction with nanoscale scatterers were complemented and confirmed by experiment. It is demonstrated that, in an embodiment, by utilizing the all-dielectric PC substrate, three major benefits can be achieved simultaneously: low-transmission on the F-incident reference beam, resonance-guided angular scattering and resonance-enhanced scattering cross section. These distinct advantages offered by PRISM allow for the real-time detection of individual biomolecules at relatively low illumination intensity, and the accurate quantification of the PC enhancement on the scattering signal for biomolecules requires further study. The PC nanostructures, produced by a low-cost replica molding process on ordinary glass coverslips, provide tunability in resonance wavelength, while the high-Q quasi-BIC resonance offers potential for further improvement on the scattering efficiency. The anisotropic property of the corrugated structure leads to the extension of the isofrequency contour into a higher NA regime, which can be further improved by a 2D lattice design.

When compared to conventional interferometric scattering microscopy techniques, PRISM achieves the high-intensity excitation limited on the PC surface through light trapping. As a result, the contrast signal is broadened due to the non-uniform PCGR mode in the transverse direction, but, in an embodiment, can be addressed by employing a multilayer PC (also known as a Bragg reflector), which comprises an alternating sequence of layers of low- and high-RI materials in the z-direction. The nanostructured resonator substrate introduces additional fabrication cost, but it also offers the interferometric scattering imaging modality to conventional laser transmission microscopes without modification on the optical path. Finally, although PRISM offers promises in utilizing a noncontact-objective for interferometric imaging without significant loss of contrast signal, by the Rayleigh criterion the maximum surface NP density will be compromised due to the lower NA.

From a nanophotonic perspective, PRISM in accordance with embodiments of the present disclosure opens avenues toward single-molecule quantification, digital resolution measurement of biomolecular interaction dynamics, and diagnostic applications based upon detection of biological nanoparticles such as viruses and extracellular vesicles. It is expected that the enhancement on the particle scattering cross section can be further improved with the help of higher Q-factor resonators, or by the synergistic coupling between the scattering probes and the PC substrate. In addition, exponentially decaying evanescent field offers approaches towards axial localization with higher accuracy in complement to the conventional PSF fitting methods.

The present invention has been described in connection with what are presently considered to be the most practical and preferred embodiments. However, the invention has been presented by way of illustration and is not intended to be limited to the disclosed embodiments. Accordingly, one of skill in the art will realize that the invention is intended to encompass all modifications and alternative arrangements within the spirit and scope of the disclosure.

What is claimed is:

1. A method, comprising:
    directing incident light onto a surface of a photonic crystal (PC), wherein the incident light has a wavelength that couples into a photonic crystal guided resonance (PCGR) mode of the PC such that less than 1% of the incident light is transmitted through the PC as transmitted light, and wherein one or more particles are adjacent to the surface of the PC and scatter a portion of the light coupled into the PCGR mode as scattered light; and
    forming an image that comprises a pattern of constructive and destructive interference between the transmitted light and the scattered light.

2. The method of claim 1, wherein the PC is a one-dimensional PC, a two-dimensional PC, or a three-dimensional PC.

3. The method of claim 1, wherein the PC is a one-dimensional PC that comprises a plurality of grating lines defined by linear ridges and linear grooves formed in a first dielectric material disposed on a second dielectric material, wherein the first dielectric material has a first index of refraction and the second dielectric material has a second index of refraction, and wherein the first index of refraction is higher than the second index of refraction.

4. The method of claim 3, wherein the first dielectric material is $TiO_2$ and the second dielectric is a polymeric material.

5. The method of claim 3, wherein the incident light is linearly polarized with an electric field direction that is perpendicular to or parallel to the grating lines.

6. The method of claim 1, wherein the PC is a one-dimensional PC that comprises a plurality of alternating layers of a first dielectric material and a second dielectric material, wherein the first dielectric material has a first index of refraction and the second dielectric material has a second index of refraction, and wherein the first index of refraction is higher than the second index of refraction.

7. The method of claim 1, wherein the PC is a two-dimensional PC that comprises a two-dimensional array of structures formed in a first dielectric material disposed on a second dielectric material, wherein the first dielectric material has a first index of refraction and the second dielectric material has a second index of refraction, and wherein the first index of refraction is higher than the second index of refraction.

8. The method of claim 1, further comprising:
    capturing, by an image sensor, a time sequence of image frames of the image during an image capture period;
    averaging each image frame with one or more other image frames within a rolling window of N sequential image frames to generate a plurality of average images, wherein N>1;
    for each average image of the plurality of average images, dividing the average image on a pixelwise basis by a respective, temporally adjacent average image to generate a plurality ratiometric images; and
    identifying in at least one of the ratiometric image at least one scattering center corresponding to at least one particle of the one or more particles.

9. The method of claim 8, further comprising:
    identifying a first-image scattering center at a first position in a first ratiometric image;
    identifying a second-image scattering center at a second position in a second ratiometric image, wherein the second ratiometric image is temporally adjacent to the first ratiometric image, and wherein the second position is different than the first position; and
    determining that the first-image scattering center and second-image scattering center both correspond to a specific particle of the one or more particles and that the specific particle was in motion during the image capture period.

10. The method of claim 1, wherein the one or more particles each have a size that is less than 100 nanometers.

11. The method of claim 1, wherein the one or more particles comprise a biomolecule.

12. The method of claim 11, wherein the biomolecule comprises a protein, a nucleic acid, a lipid, or a polysaccharide.

13. The method of claim 1, wherein the one or more particles are virions.

14. The method of claim 1, wherein the one or more particles are extracellular vesicles.

15. The method of claim 1, wherein the one or more particles are lipid vesicles.

16. The method of claim 1, wherein the one or more particles are disposed in a liquid medium on the surface of the PC.

17. The method of claim 1, wherein directing incident light onto the surface of the PC comprises directing the incident light onto the surface of the PC at an angle of incidence that couples the wavelength into the PCGR mode of the PC.

18. The method of claim 17, wherein the angle of incidence is within 10 degrees of normal incidence.

19. The method of claim 1, wherein the incident light is collimated and linearly polarized.

20. The method of claim 19, wherein directing incident light onto the surface of the PC comprises directing the incident light onto the surface of the PC through a microscope objective.

21. The method of claim 20, wherein the microscope objective is a non-immersion objective.

22. The method of claim 20, further comprising:
    emitting light from a light source; and
    directing the emitted light to the microscope objective.

23. The method of claim 22, wherein the light source comprises a laser.

24. The method of claim 22, further comprising:
    wavelength-filtering the emitted light.

25. The method of claim 22, further comprising:
    adjusting, by a half-wave plate, a polarization direction of the emitted light.

26. The method of claim 1, wherein forming the image comprises:
    collecting, by a microscope objective, a portion of the transmitted light and scattered light; and
    focusing the collected light onto an image sensor.

27. The method of claim 26, wherein the microscope objective is a non-immersion objective.

28. The method of claim 1, wherein the PC causes enhanced scattering by the one or more particles as compared to a conventional interferometric scattering microscopy (iSCAT) system.

29. The method of claim 28, wherein the conventional iSCAT system uses a coverslip as a reference substrate and a partially transmissive gold disk to attenuate a reference beam.

30. A system, comprising:
a photonic crystal (PC);
an illumination objective configured to direct incident light onto a surface of the PC, wherein the incident light has a wavelength that couples into a photonic crystal guided resonance (PCGR) mode of the PC such that less than 1% of the incident light is transmitted through the PC as transmitted light; and
an imaging objective configured to form an image that comprises a pattern of constructive and destructive interference between the transmitted light and scattered light, wherein the scattered light is from one or more particles that are adjacent to the surface of the PC and that scatter a portion of the light coupled into the PCGR mode.

31. The system of claim 30, wherein the illumination objective is a microscope objective.

32. The system of claim 31, wherein the microscope objective is a non-immersion objective.

33. The system of claim 30, further comprising:
a light source optically coupled to the illumination objective, wherein the incident light comprises light emitted from the light source that has passed through illumination objective.

34. The system of claim 33, wherein the illumination objective collimates the light emitted from the light source.

35. The system of claim 33, wherein the light source comprises a laser.

36. The system of claim 33, further comprising:
a wavelength-selective filter, wherein the light source is optically coupled to the illumination objective via the wavelength-selective filter.

37. The system of claim 33, further comprising:
a linear polarizer, wherein the light source is optically coupled to the illumination objective via the linear polarizer.

38. The system of claim 33, further comprising:
a half-wave plate, wherein the light source is optically coupled to the illumination objective via the half-wave plate.

39. The system of claim 30, wherein the PC is a one-dimensional PC, a two-dimensional PC, or a three-dimensional PC.

40. The system of claim 30, wherein the PC is a one-dimensional PC that comprises a plurality of grating lines defined by linear ridges and linear grooves formed in a first dielectric material disposed on a second dielectric material, wherein the first dielectric material has a first index of refraction and the second dielectric material has a second index of refraction, and wherein the first index of refraction is higher than the second index of refraction.

41. The system of claim 40, wherein the incident light is linearly polarized such that the incident light comprises an electric field in a direction perpendicular to or parallel to the grating lines.

42. The system of claim 30, wherein the PC is a one-dimensional PC that comprises a plurality of alternating layers of a first dielectric material and a second dielectric material, wherein the first dielectric material has a first index of refraction and the second dielectric material has a second index of refraction, and wherein the first index of refraction is higher than the second index of refraction.

43. The system of claim 30, wherein the PC is a two-dimensional PC that comprises a two-dimensional array of structures formed in a first dielectric material disposed on a second dielectric material, wherein the first dielectric material has a first index of refraction and the second dielectric material has a second index of refraction, and wherein the first index of refraction is higher than the second index of refraction.

44. The system of claim 30, further comprising:
a liquid medium on the surface of the PC, wherein the one or more particles are disposed in the liquid medium.

45. The system of claim 30, wherein the imaging objective is a microscope objective.

46. The system of claim 44, wherein the microscope objective is a non-immersion objective.

47. The system of claim 30, further comprising:
an image sensor, wherein the image sensor is configured to capture one or more image frames of the image.

48. The system of claim 47, further comprising:
a controller coupled to the image sensor, wherein the controller is configured to control the image sensor to capture a plurality of image frames of the image, at a specified frame rate, during an image capture period.

49. The system of claim 48, further comprising:
a computing device coupled to the image sensor, wherein the computing device is configured to perform image processing operations on the plurality of image frames, wherein the image processing operations comprise:
averaging each image frame with one or more other image frames within a rolling window of N sequential image frames to generate a plurality of average images, wherein N>1;
for each average image of the plurality of average images, dividing the average image on a pixelwise basis by a respective, temporally adjacent average image to generate a plurality ratiometric images; and
identifying in at least one of the ratiometric image at least one scattering center corresponding to at least one particle of the one or more particles.

50. The system of claim 49, wherein the image processing operations further comprise:
identifying a first-image scattering center at a first position in a first ratiometric image;
identifying a second-image scattering center at a second position in a second ratiometric image, wherein the second ratiometric image is temporally adjacent to the first ratiometric image, and wherein the second position is different than the first position; and
determining that the first-image scattering center and second-image scattering center both correspond to a specific particle of the one or more particles and that the specific particle was in motion during the image capture period.

51. The system of claim 30, wherein the PC causes enhanced scattering by the one or more particles as compared to a conventional interferometric scattering microscopy (iSCAT) system.

52. The system of claim 51, wherein the conventional iSCAT system uses a coverslip as a reference substrate and a partially transmissive gold disk to attenuate a reference beam.

* * * * *